(12) United States Patent
Eder et al.

(10) Patent No.: US 8,997,957 B2
(45) Date of Patent: Apr. 7, 2015

(54) COUPLING ARRANGEMENT

(75) Inventors: Klaus Eder, Graz (AT); Markus Kohlböck, Ottnang am Hausruck (AT); Johannes Quehenberger, Saalbach (AT); Reinhard Weingartshofer, Söding (AT)

(73) Assignee: MAGNA Powertrain AG, Lannach (AT)

( * ) Notice: Subject to any disclaimer, the term of this patent is extended or adjusted under 35 U.S.C. 154(b) by 208 days.

(21) Appl. No.: 13/640,766

(22) PCT Filed: Apr. 8, 2011

(86) PCT No.: PCT/EP2011/055543
§ 371 (c)(1),
(2), (4) Date: Dec. 24, 2012

(87) PCT Pub. No.: WO2011/128273
PCT Pub. Date: Oct. 20, 2011

(65) Prior Publication Data
US 2013/0199884 A1 Aug. 8, 2013

Related U.S. Application Data

(60) Provisional application No. 61/323,198, filed on Apr. 12, 2010.

(30) Foreign Application Priority Data

Sep. 17, 2010 (DE) .......................... 10 2010 045 898

(51) Int. Cl.
F16D 11/14 (2006.01)

(52) U.S. Cl.
CPC ....................................... F16D 11/14 (2013.01)

(58) Field of Classification Search
USPC .................................. 192/69.82, 109 D, 200
See application file for complete search history.

(56) References Cited

U.S. PATENT DOCUMENTS 1,830,744 A * 11/1931 Logue .............................. 192/57
6,112,873 A 9/2000 Prasse et al.
7,594,869 B2 * 9/2009 Holmes .............................. 475/5

FOREIGN PATENT DOCUMENTS

DE 19654896 A1 * 1/1998
DE 10 2009 049 013 A1 4/2010
JP 2001271847 A * 10/2001

* cited by examiner

*Primary Examiner* — Richard Lorence
(74) *Attorney, Agent, or Firm* — Jordan IP Law, LLC; Todd A. Vaughn

(57) ABSTRACT

A coupling arrangement for a drive train of a motor vehicle includes at least one clutch which is arranged on a rotating shaft in order to couple the rotating shaft optionally with a drive element of the drive train, in which to couple the rotating shaft with the drive element, a first clutch part and a second clutch part can be brought into a form-fit engagement with each other by moving one of the clutch parts along the axis of the rotating shaft. To prevent jerks and vibrations in the drive train, a hydraulic damping device is provided which acts between the first clutch part and the second clutch part.

20 Claims, 12 Drawing Sheets

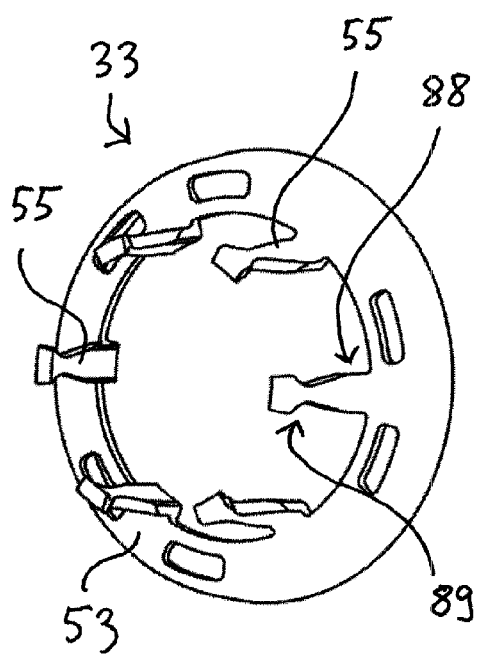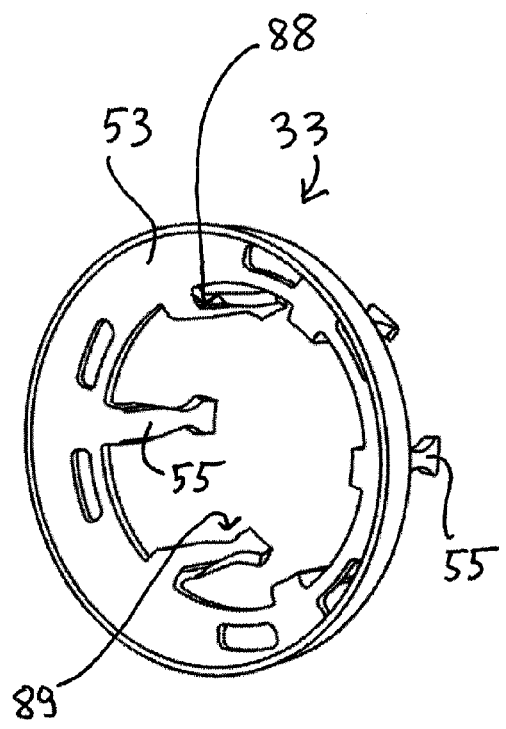
Fig. 15                    Fig. 16

COUPLING ARRANGEMENT

CROSS-REFERENCE TO RELATED APPLICATIONS

The present application is a National Stage Application of PCT International Application No. PCT/EP2011/055543 (filed on Apr. 8, 2011), under 35 U.S.C. §371, which claims priority to German Patent Application No. DE 10 2010 045 898.8 (filed on Sep. 17, 2010) and U.S. Provisional Patent Application No. 61/323,198 (filed on Apr. 12, 2010), which are each hereby incorporated by reference in their respective entireties.

FIELD OF THE INVENTION

The present invention concerns a coupling arrangement for a drive train of a motor vehicle, with at least one clutch which is arranged on a rotating shaft in order to couple the rotating shaft optionally with a drive element of the drive train, wherein to couple the rotating shaft with the drive element, a first clutch part and a second clutch part can be brought into form-fit engagement with each other by moving one of the clutch parts along the axis of the rotating shaft.

The drive element of the drive train to be coupled to the rotating shaft can be a further shaft or a gear element. For example on activation of the clutch, a form-fit connection can be provided between firstly the rotating shaft and secondly an input shaft, an output shaft, a housing or a plate wheel of a differential gear, or a gearwheel of an angular gear.

Especially the present invention is based on priority DE 102010045898, hereby incorporated by reference.

BACKGROUND OF THE INVENTION

Such devices can be used, for example, in the form of so-called disconnect systems to decouple parts of the drive train in a motor vehicle with selectable all-wheel drive so that in two-wheel drive, the connection between the primary axle or drive unit on one side and the secondary axle on the other can be at least partly separated. In order thus to prevent the associated movement of parts of the drive train not required in permanent two-wheel drive mode, in particular unnecessary masses, by releasing the clutch the torque transfer segment leading to the secondary axle can be interrupted.

Alternatively, coupling arrangements of said type can also be used in a vehicle with hybrid drive during electric operating mode to separate the main transmission from the combustion engine in order thus to prevent power losses and minimize noise. A drive train decoupling for an electric drive can also be provided on the secondary axle. In the known systems, the clutches are activated i.e. opened or closed either by means of a hydraulic or pneumatic actuator or by means of an electric motor. In general the torque transmission can take place from the rotating shaft as input element to said drive element of the drive train as output element, or in the opposite direction.

A coupling arrangement of the generic type is disclosed in DE 10 2009 049 013 A1. In this system, an electric motor is provided to move a clutch switch element in the opening direction, while the movement of the switch element in the closing direction is achieved by a spring element.

In the known applications the aim is to engage the clutch based on the principle of form-fit engagement, for example, a claw-type clutch, with relatively high speed. This can, however, lead to shocks, vibrations and noise in the drive train, which are perceived as unpleasant by the driver of the vehicle.

SUMMARY OF THE INVENTION

One object of the present invention is to improve coupling arrangements of said type in this respect.

The object is achieved by a coupling arrangement with at least one clutch which is arranged on a rotating shaft in order to couple the rotating shaft optionally with a drive element of the drive train, wherein to couple the rotating shaft with the drive element a first clutch part and a second clutch part can be brought into a form-fit engagement with each other by moving one of the clutch parts along the axis of the rotating shaft.

In accordance with embodiments of the invention, a hydraulic damping device is provided which acts between the first clutch part and the second clutch part. The hydraulic damping device works on the principle that on axial movement of the first clutch part relative to the second clutch part, a fluid is compressed and/or displaced and hence the movement of the clutch part delayed in a controlled fashion. In this way, despite a rapid engagement, undesirable jerks and noise in the drive train are prevented.

The directional terms "axial" and "radial" in the context of the present invention always relate to the axis of the rotating shaft.

Refinements of the invention are given in the subclaims, the description and the enclosed drawings.

Preferably, the hydraulic damping device comprises a damping chamber to receive a hydraulic fluid, which has two wall segments mobile relative to each other and each coupled with one of the clutch parts, wherein at least one outflow opening allows an escape of the fluid from the damping chamber. The wall segments can in principle be formed directly on the respective clutch part. They can, however, also belong to separate components which are in mechanical connection with the clutch parts, where applicable via several transmission elements. Because the wall segments are in mechanical connection with the clutch parts, on a movement of the clutch parts towards each other the damping chamber becomes smaller and the hydraulic fluid is consequently expelled from the damping chamber via the outflow opening. Because of the choked flow of fluid from the damping chamber into a further receiving region, the movement of the wall segments and hence the clutch parts is opposed to a mechanical resistance, which finally leads to a damping of the engagement movement. The extent of choking of the fluid escape from the damping chamber can be adjusted via the size and form of the outflow opening and where applicable via the provision of several outflow openings.

The coupling arrangement can comprise an actuator device for the clutch, wherein the damping chamber is formed between two actuators of the actuator device. In this way, for example, a cavity which is present in any case between two actuators can advantageously be used as a damping chamber.

The damping chamber can in particular be formed between two annular or sleeve-like actuators of the actuator device and a clutch housing. In accordance with one embodiment, the damping chamber can be an annular chamber which is formed, e.g., about a central shaft.

In accordance with a further embodiment of the invention, at least one tolerance-induced gap between two clutch components serves as an outflow opening. This allows a particularly simple and economic construction as in this case no separate outflow opening need be provided in the wall of the damping chamber.

In released state of the clutch, the damping chamber can be filled only partly with the fluid. Then an air or gas cushion can form above the fluid level. On engagement of the clutch and the associated reduction in size of the damping chamber, with a correspondingly positioned outflow opening first the air from the air cushion is expelled from the damping chamber with relatively low resistance. Only after the air cushion has been consumed is a relatively strong damping of the clutch part movement achieved on the outflow of the hydraulic fluid due to the increased resistance. In this way, the development of damping during the engagement or release process can be adapted more precisely.

In accordance with a further embodiment of the invention, the damping chamber in released state of the clutch is in connection with a balancing chamber via a connection opening. The connection opening can be structured such that it allows a relatively lightly choked escape of fluid from the damping chamber into the balancing chamber, in order, thus, to reduce the extent of damping.

On one of the wall segments of the damping chamber can also be provided a control segment which provokes a closure of the connection opening as soon as the one clutch part reaches a predetermined position on an axial movement in the engagement direction. The predetermined position thus defines the point at which the full damping force is applied. With such a control segment which closes a connection opening, therefore, the damping characteristics can be adapted more precisely.

Furthermore, an elastic element, in particular a rubber buffer, can be provided which acts between the two clutch parts. Such an elastic element can be used for further adaptation of the damping characteristics. In particular, it can serve to stop finally the axial movement of the first clutch part relative to the second clutch part.

In accordance with one embodiment of the invention, the damping device is formed such that contact between the faces of the clutch parts on engagement of the clutch is prevented directly. This allows a particularly gentle and quiet coupling.

In accordance with a further embodiment of the invention, the two clutch parts are pretensioned relative to each other in the engagement direction. When on engagement of the clutch a "tooth-on-tooth" position occurs, a continuously acting pretension force provided, e.g., by means of a spring element can ensure that, on the presence of a relative twist between the two clutch parts, engagement takes place directly as soon as the clutch parts are oriented correctly to each other. In order to guarantee rapid engagement here in general a relatively large pretension force is required. The inevitably associated risk of jerks and vibrations can however be avoided by a damping device in accordance with the invention.

BRIEF DESCRIPTION OF THE DRAWINGS

The invention is described below as an example with reference to the drawings, in which:

FIG. 15 illustrates a back view of a spring ring of a synchronizer device of the coupling arrangement of FIG. 1.

FIG. 16 illustrates a front view of the spring ring of FIG. 15.

DETAILED DESCRIPTION OF EMBODIMENTS

Figure 1:
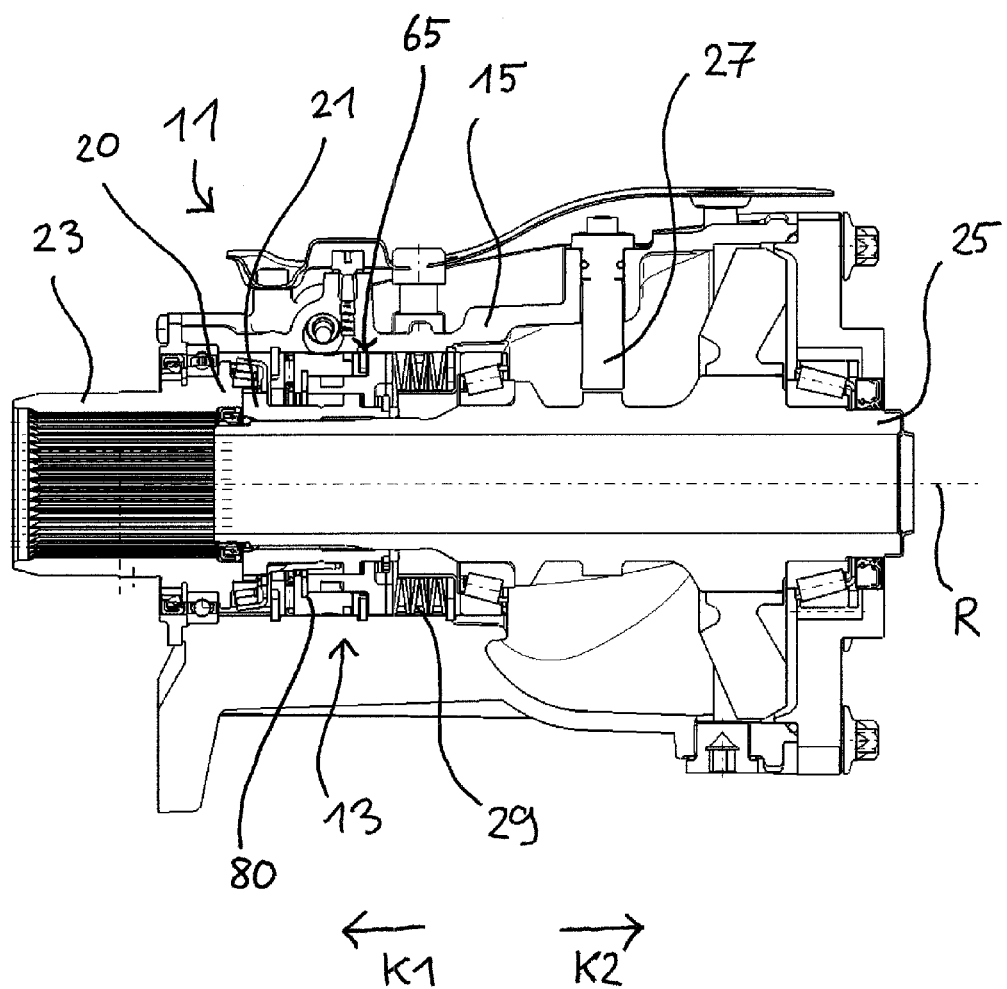
FIG. 1 illustrates a sectional view of a coupling arrangement in accordance with the invention.
Figure 2:
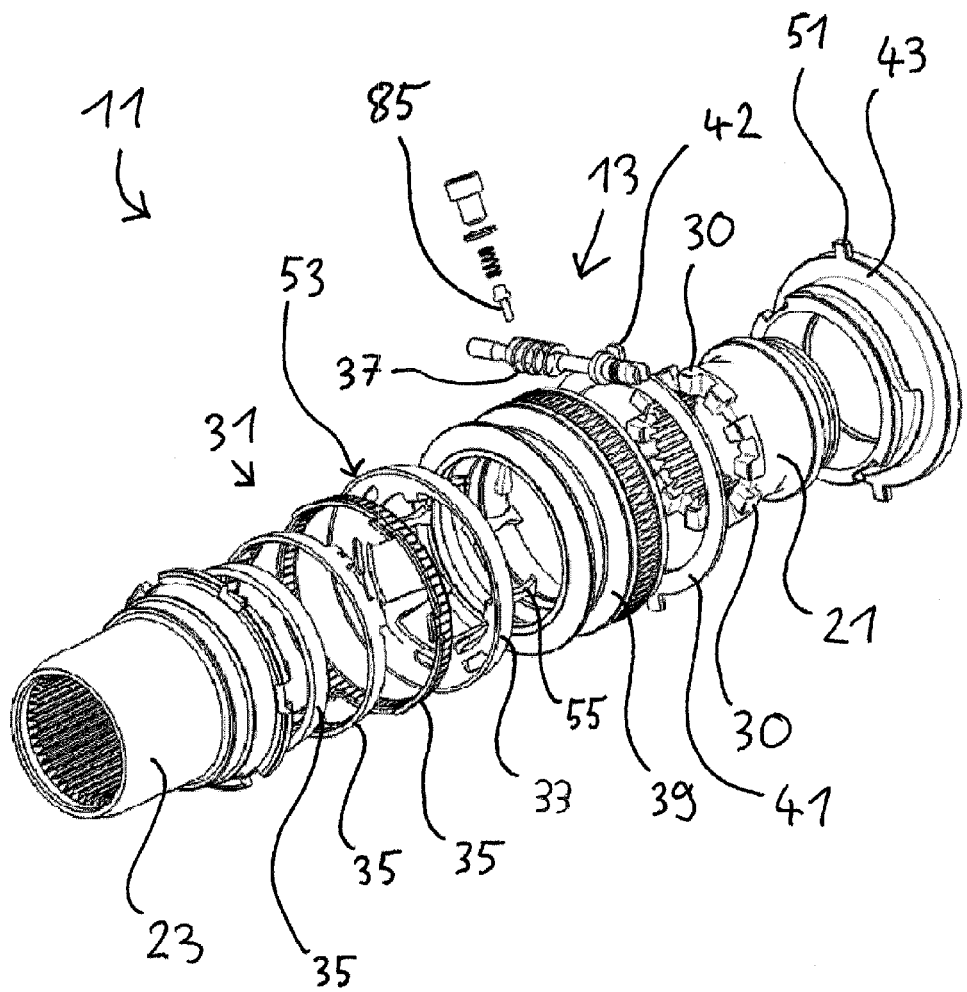
FIG. 2 illustrates an exploded view of the coupling arrangement of FIG. 1 from the front.
Figure 3:
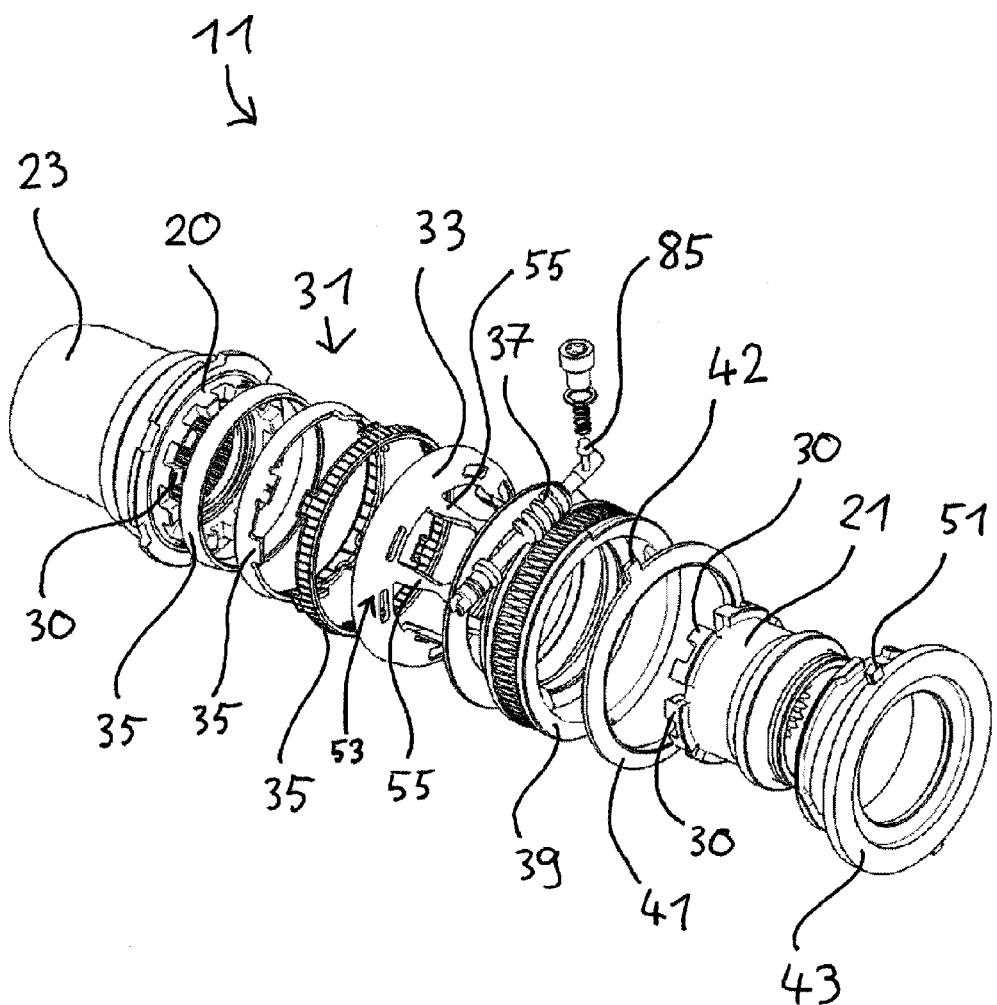
FIG. 3 illustrates an exploded view of the coupling arrangement of FIG. 1 from behind.

FIGS. 1 to 3 illustrate a coupling arrangement in accordance with the invention which can be installed at various places within a drive train of a motor vehicle in order to couple together optionally two components of the drive train. In particular, the coupling arrangement can form a longitudinal or transverse disconnect system in a motor vehicle with manually or automatically selectable all-wheel drive.

In principle, it is also conceivable by means of the coupling arrangement to decouple an internal combustion engine from the primary drive train in order to reduce losses which result from continued rotation of drive train components, such as manual or automatic transmissions, when the vehicle is moving or driven by an electric motor on the secondary axle. The coupling arrangement can also be used in a hybrid vehicle with drive by an electric motor on the secondary axle in order to decouple the electric motor from the drive train when this is not required or if an excessive speed increase must be prevented.

The coupling arrangement comprises a claw-type clutch 11 and an actuator device 13 accommodated in a common housing 15. The actuator device 13 can be controlled by an electronic control unit (not illustrated).

The claw-type clutch 11 comprises a first clutch part 20 and a second clutch part 21 which can be brought into form-fit engagement to close the claw-type clutch 11. The first clutch part 20 is coupled with an input half-shaft 23 which rotates about rotation axis R and in turn is coupled, e.g., with a front axle differential of the motor vehicle. The second clutch part 21 is coupled with an output half-shaft 25 which in turn is coupled, e.g., with a rear axle differential of the motor vehicle. When the two clutch parts 20, 21 are in form-fit engagement, the claw-type clutch 11 is engaged and torque is transmitted from the input half-shaft 23 to the output half-shaft 25, i.e., from the front axle to the rear axle of the drive train. When the two clutch parts 20, 21, however, are not in engagement, the claw-type clutch 11 is open and the input half-shaft 23 is separated from the output half-shaft 25. The claw-type clutch 11 is opened and closed in that the second clutch part 21 is moved along the rotation axis R relative to the first clutch part 20.

A rotation speed sensor 27 is provided to detect the momentary rotation speed of the output half-shaft 25. The rotation speed sensor 27 can determine the rotation speed either by means of a separately provided marker wheel or from the toothing of components of the actual coupling arrangement. In particular an ABS sensor can be used.

By means of a spring 29, in the present embodiment example a Belleville spring, the second clutch part 21 is pretensioned in the engagement or closing direction K1 of the claw-type clutch 11. The spring 29 is tensioned on each release or opening of the claw-type clutch 11 when the second clutch part 21 is moved against the spring force in the release or opening direction K2.

Figure 4:
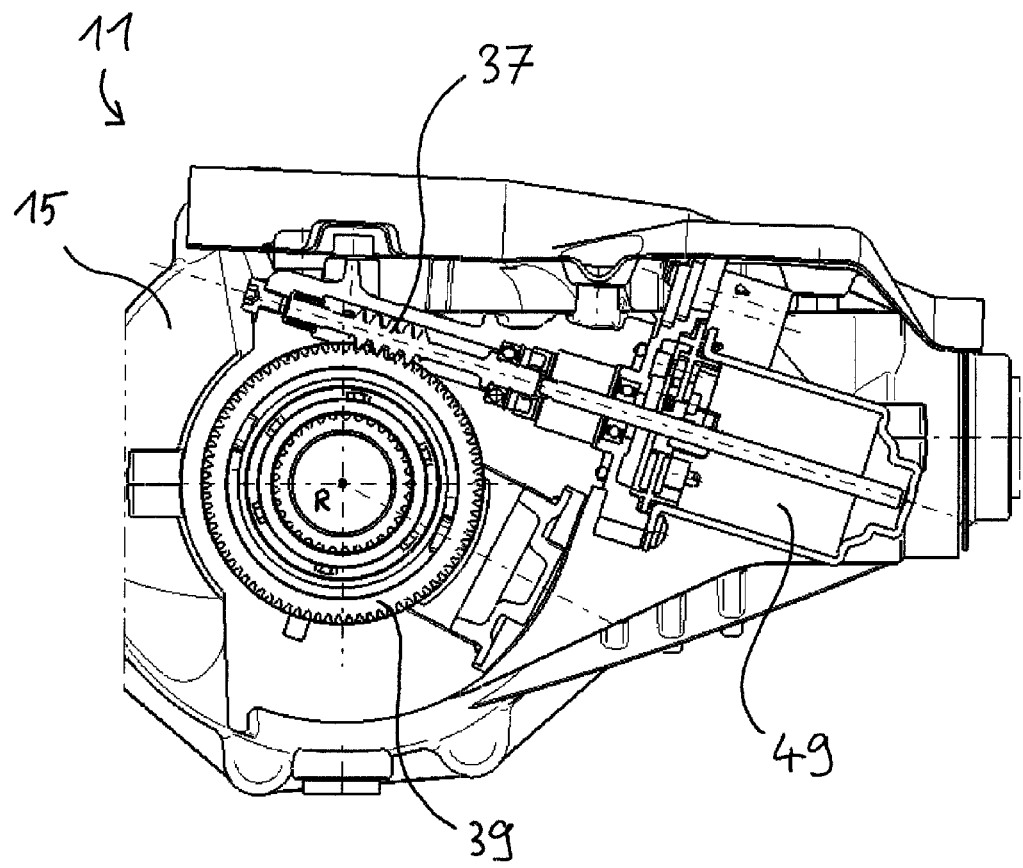
FIG. 4 illustrates a back view of the coupling arrangement of FIG. 1.

As evident from the exploded views in FIGS. 2 and 3, the clutch parts 20, 21 are formed sleeve-like and on their face each have tooth-like claws 30. To balance the rotation speeds of the input half-shaft 23 and output half-shaft 25, a synchronizing device 31 is integrated in the claw-type clutch 11, and which comprises a spring ring 33 and several synchronizer rings 35. The actuator device 13 of the claw-type clutch 11 comprises a worm 37, a worm gearwheel 39 engaging with the worm 37, a control ring 41 with fingers 42 and a ramp ring 43. On the inner diameter of the worm gearwheel 39 are provided two switch protrusions 45 which engage in a switch ramp 47 on the outer diameter of the ramp ring 43 and are able to move the ramp ring 43 in both axial directions K1, K2 when the worm gearwheel 39 is rotated about rotation axis R, as explained in more detail below with further reference to FIG. 4.

On twisting of the worm gearwheel 39 against the ramp ring 43 about rotation axis R, because of the cooperation of the switch protrusions 45 and switch ramp 47, an axial displacement of the ramp ring 43 takes place along the rotation axis R. To achieve such a relative twist between the worm gearwheel 39 and ramp ring 43, the worm 37 engaging with the worm gearwheel 39 can be driven by an electric motor 49. To open the claw-type clutch 11, therefore, the worm gearwheel 39 is set in rotation by means of the electric motor 49 and in turn axially displaces the ramp ring 43 against the force of the spring 29. The second clutch part 21 is also moved via a sliding engagement with the ramp ring 43.

The worm gearwheel 39 is mounted such that during the twist it does not execute any axial movement. In contrast, the ramp ring 43 is axially displaceable, wherein fingers 51 provided on the outer diameter of the ramp ring 43 are held sliding in corresponding grooves (not illustrated) of the housing 15 in order to prevent an auto-rotation of the ramp ring 43.

The spring 29 presses the ramp ring 43 in the closing direction K1 against the second clutch part 21. This firstly supports the electric motor 49 in applying the necessary axial force to the synchronizer rings 35 during the synchronization process. The ramp ring 43 and the switch protrusions 45 cooperating therewith, which in principle can be formed as blocks or pins—are therefore formed such that the force of the electric motor 49 and the force of the spring 29 are exerted in combination on the second clutch part 21. Secondly the spring 29 serves as a force accumulator for the actual engagement process after the synchronization process. If namely the claw-type clutch 11 must be engaged after the synchronization process, the presence of a "tooth-on-tooth" position of the clutch parts 20, 21 is probable. The claw-type clutch 11 cannot engage in this case. Consequently, a relative twist is required between the first clutch part 20 and the second clutch part 21 in order finally to allow engagement. The spring 29 here acts as an energy accumulator until the clutch parts 20, 21 have reached the correct position ("tooth-on-gap").

Figure 5:
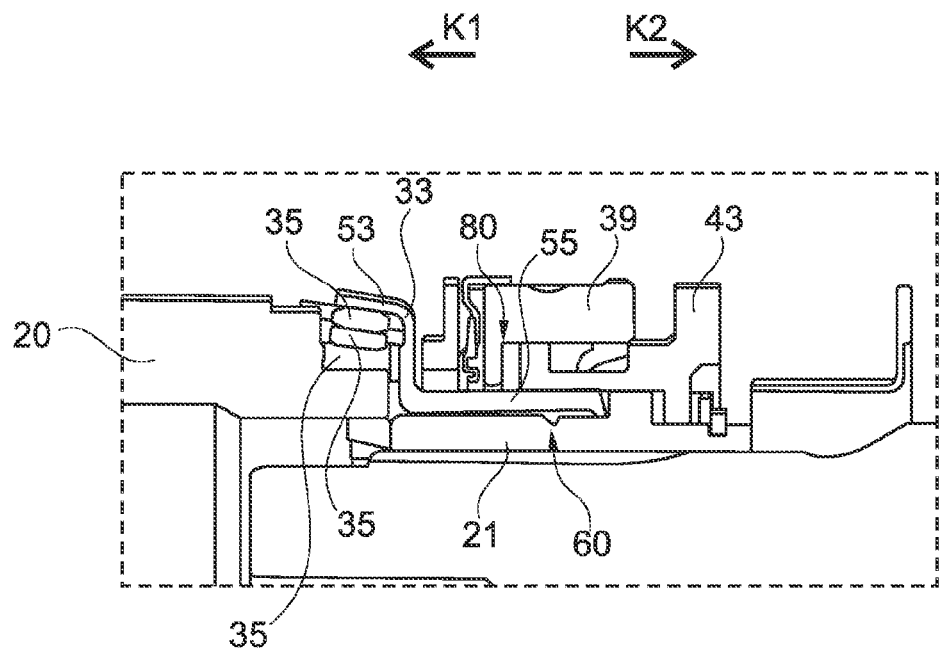
FIG. 5 illustrates a partial view of the coupling arrangement of FIG. 1 in which a clutch of the coupling arrangement is in an engaged state.
Figure 6:
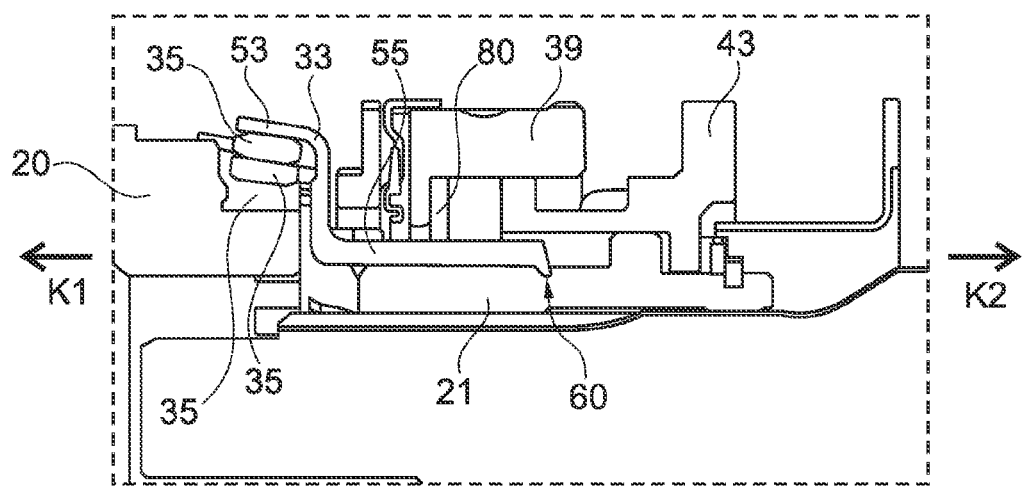
FIG. 6 illustrates a partial view of the coupling arrangement of FIG. 1 in which the clutch is in a released state.

During the synchronization process, as illustrated in FIGS. 5 and 6, the second clutch part 21 presses against the spring ring 33 which comprises a sleeve-like base body 53 and several snap fingers 55. The inner periphery of the sleeve-like base body 53 forms an outer friction cone of the synchronization device 31. In a starting phase of the synchronization process, the snap fingers 55 of the spring ring 33 come into engagement with a groove 60 formed on the outer periphery of the second clutch part 21. A defined force is necessary to press the snap fingers 55 of the spring ring 33 out of the groove 60. This force is equal to the maximum force for bringing the friction cone of the synchronizer rings 35 into engagement.

To exert the correct force on the spring ring 33, the electric motor 49 is controlled accordingly. Depending on application, the control method can be position-based, current-based, based on the rotation speed of the secondary drive train, or a control strategy combined from these principles.

As soon as a starting phase of the synchronizing process has ended and the rotation speed of the output half-shaft 23 has at least substantially reached the rotation speed of the input half-shaft 25, the engagement process of the claw-type clutch 11 can begin. The axial force on the ramp ring 43 is increased so that the spring ring 33 is pressed out of the groove 60 of the second clutch part 21. The ramp ring 43 presses the second clutch part 21 further forward along the rotation axis R in the closing direction K1 of the claw-type clutch 11. Depending on the momentary relative position of the claws 30 of the first clutch part 20 and the second clutch part 21, the claw-type clutch 11 is closed either immediately or after a relatively short further relative rotation of the two clutch parts 20, 21. This state is illustrated in FIG. 5. To open the claw-type clutch 11 again, the worm gearwheel 39 is turned further so that the switch protrusions 45 move the ramp ring 43 into the released position illustrated in FIG. 6. In the fully open position, the spring ring 33 again snaps into the groove 60 of the second clutch part 21.

To avoid excessively abrupt engagement and in particular contact between the two clutch parts 20, 21, a hydraulic damping device 65 is provided which acts between the first clutch part 20 and the second clutch part 21, which is described in more detail below with reference to FIG. 7.

The damping device 65 comprises a damping chamber 67 which in released state of the claw-type clutch 11 is partly filled with a hydraulic fluid so that an air cushion forms above the fluid level. The fluid can in particular be a hydraulic oil. The damping chamber 67 is formed between the control ring 41, the ramp ring 43 and the housing 15 and therefore forms an annular chamber centered around the rotation axis R. If pressurized, the fluid can flow out of the damping chamber 67 via tolerance-induced gap 69 between the individual components. Furthermore a connection opening 71 is provided with which the damping chamber 67 is in connection with a balancing chamber 73 when the claw-type clutch 11 is in the released state. In the partly engaged position of the claw-type clutch 11 illustrated in FIG. 7, the connection opening 71 is closed by a control wall segment 75 protruding axially from the control ring 41 and the damping chamber 67 is completely filled with the fluid.

The damping chamber 67 is limited in the radial direction by fixed wall segments of the ramp ring 43 and housing 15 and in the axial direction by a face wall segment 76 of the control ring 41 and by a face wall segment 77 of the ramp ring 43. On axial movement of the ramp ring 43 in the closing direction K1 of the claw-type clutch 11, the face wall segment 77 of the ramp ring 43 moves towards the face wall segment 76 of the control ring 41 so that the volume of the damping chamber 67 becomes smaller. This leads firstly to the air above the fluid level being expelled from the damping chamber 67 through the gap 69 with relatively low resistance.

Figure 7:
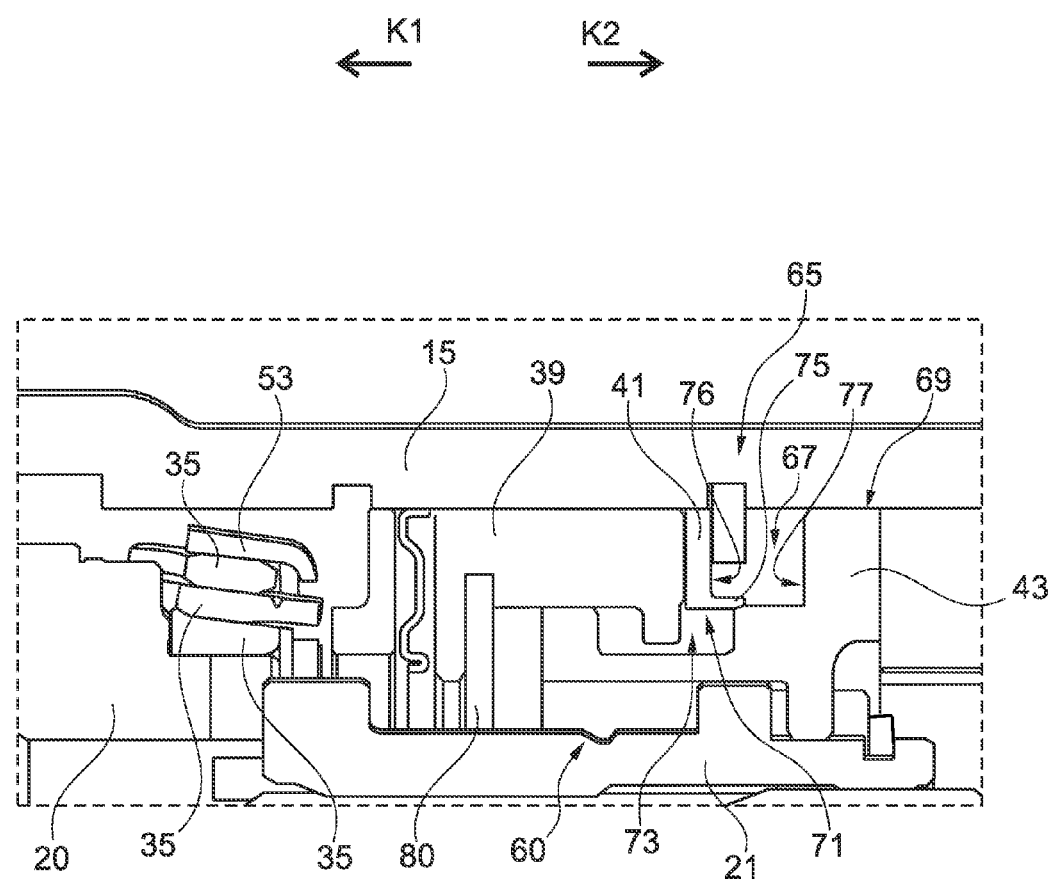
FIG. 7 illustrates a partial view of the coupling arrangement of FIG. 1 in which the clutch is in an engagement process and also the position of a damping chamber.

As soon as the air from the air cushion has been consumed and the damping chamber 67 is fully filled with fluid as in FIG. 7, the fluid flows in a choked manner out of the damping chamber 67, which opposes the movement of the ramp ring 43 with a mechanical resistance. The opening area available for the outflow is defined by the tolerances between the worm gearwheel 39, the control ring 41, the ramp ring 43 and the housing 15. The damping characteristics can also be adapted by the shapes of the abovementioned axial groove for the finger 51 (FIG. 2) of the ramp ring 43, the finger 51 of the ramp ring 43 itself and the finger 42 of the control ring 41.

The length of the control wall segment 75 of the control ring 41 defines the point from which the connection opening 71 is closed and hence the actual hydraulic damping effect begins. On reaching a predetermined position during an axial movement of the second clutch part 21 in the closing direction K1 of the claw-type clutch 11, the control wall segment 75 interrupts the connection between the damping chamber 67 and the balancing chamber 73.

In addition to the hydraulic damping device 65, an elastic damping element is also provided in the form of a rubber buffer 80 which is placed between the axially fixed worm gearwheel 39 and the ramp ring 43. The rubber buffer 80 here is used to end the axial movement of the ramp ring 43 in the closing direction K1. The combination of the two damping mechanisms—the hydraulic damping device 65 and rubber buffer 80, serves to prevent directly a contact between the clutch parts 20, 21 on engagement. The engagement movement is therefore stopped shortly before the clutch parts 20, 21 touch, so that direct contact between the clutch parts 20, 21 in the axial direction and hence an undesirable shock is prevented.

Figure 8:
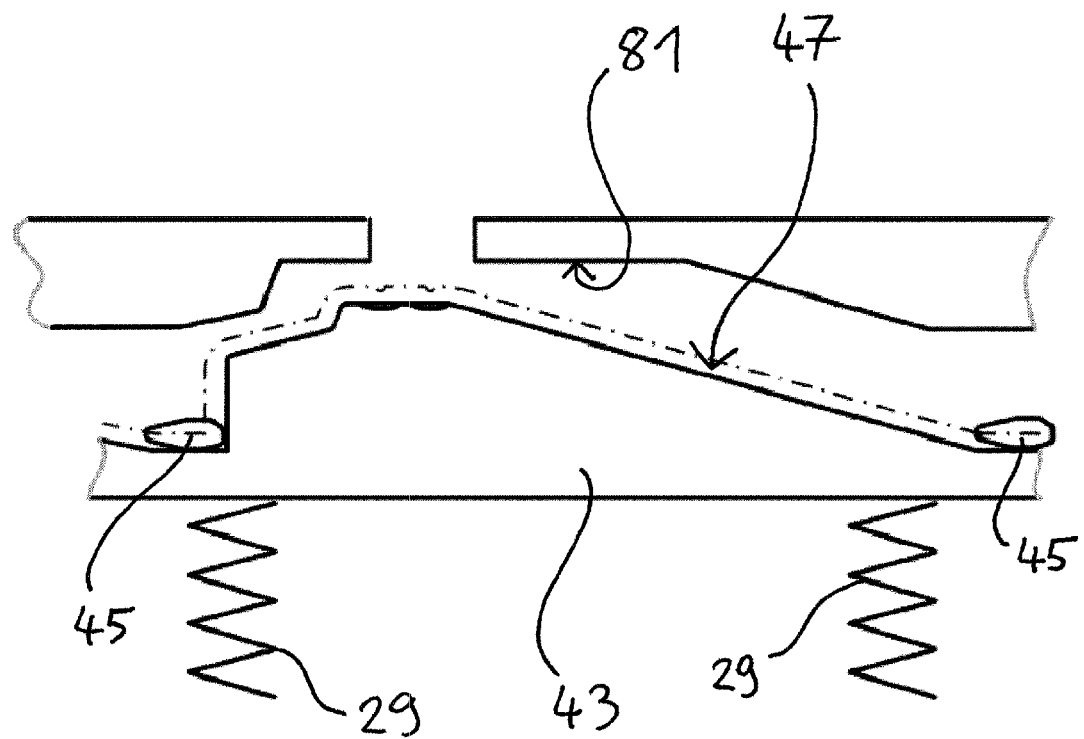
FIG. 8 illustrates an exploded view of a ramp mechanism of an actuator device of the coupling arrangement of FIG. 1.

As illustrated in FIGS. 8 to 13, the ramp mechanism formed by the cooperation of the switch protrusions 45 and switch ramp 47 is described in more detail. FIG. 8 illustrates an exploded view of the switch ramp 47 of the ramp ring 43 in the engaged position of the claw-type clutch 11. It is noted that only 180° of the switch ramp 47 are illustrated. To exert a symmetrical force, two switch protrusions 45 are provided and the control curve of the switch ramp 47 is repeated after 180°. The number of switch protrusions 45 is however not generally limited to two. The ramp ring 43 during engagement of the claw-type clutch 11 moves in the axial direction. When the ramp ring 43 is moved upward as illustrated in FIG. 8, the claw-type clutch 11 is closed and when the ramp ring 43 is moved downward, the claw-type clutch 11 is opened. As stated above, the worm gearwheel 39 with the switch protrusions 45 rotates about the rotation axis R but does not move in the axial direction. To reduce the Hertzian stress, switch protrusions 45 with flat surfaces or with surfaces with great radius of curvature are used. The switch protrusions 45 are arranged below the worm gearwheel 39 to achieve the smallest possible design of the coupling arrangement. To the same end, the second clutch part 21 is arranged below the ramp ring 43 and the worm gearwheel 39.

Figure 9A:
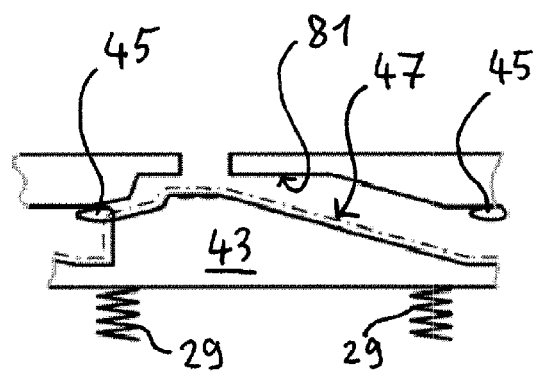
FIGS. 9A, 9B, 9C, and 9D respectively illustrate the ramp mechanism of FIG. 8 in various operating states.

As illustrated in FIGS. 9A to 9D, various operating states of the ramp mechanism are described. FIG. 9A illustrates the ramp mechanism in a "tooth-on-tooth" position of the two clutch parts 20, 21. The ramp ring 43 is pressed by the spring 29 into the closing position but prevented from further movement in the closing direction K1 by the clutch parts 20, 21. The switch ramp 47 is designed such that the switch protrusions 45 are not supported. Thus the ramp ring 43 and the second clutch part 21 are able to move as soon as possible when the clutch parts 20, 21 reach a "tooth-on-gap" position.

Figure 9B:
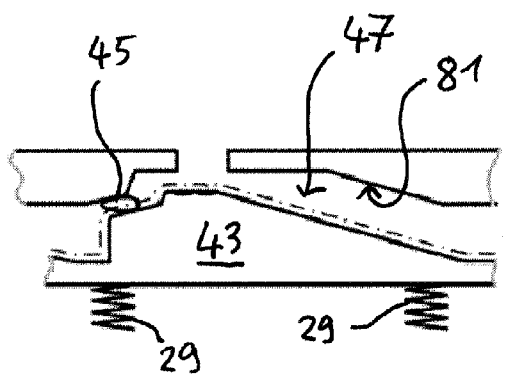

FIG. 9B illustrates the ramp mechanism during the synchronization process. The ramp ring 43 is pressed by the spring 29 in the closing direction K1 and, depending on the counterforce, also pressed away by the spring ring 33. This is the only position at which the top 81 of the switch ramp 47 is required. The ramp ring 43 is force-positioned directly by the worm gearwheel 39. To achieve the necessary force to press the spring ring 33 out of the groove 60, the amounts of spring forces of the spring ring 33 and the spring 29 are of the same order of magnitude.

Figure 9C:
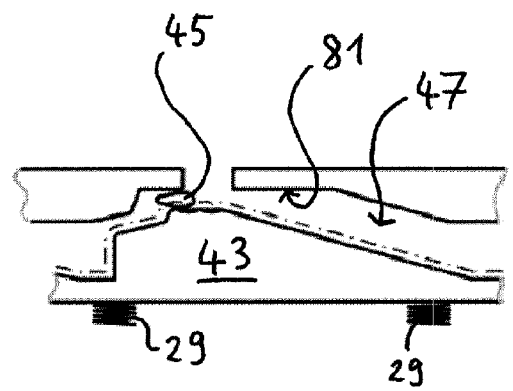

FIG. 9C illustrates the ramp mechanism in the opening position of the claw-type clutch 11. The switch protrusions 45 are at the highest point of the switch ramp 47. To pass through the necessary play defined by the friction cone of the synchronizer rings 35 and reach the synchronizing position more quickly, a short segment of switch ramp 47 can have a steeper course.

Figure 9D:
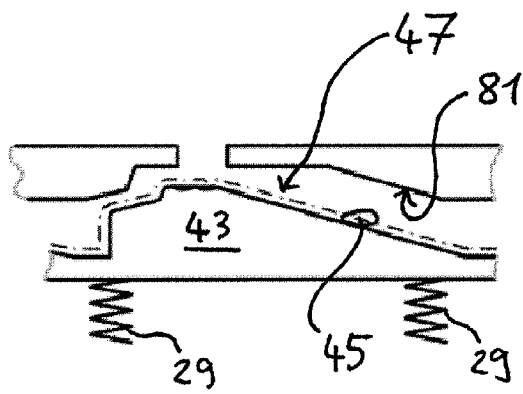

FIG. 9D illustrates the ramp mechanism during opening of the claw-type clutch 11. The ramp ring 43 is moved against the force of the spring 29 in the opening direction K2 of the claw-type clutch 11. This phase, during which the spring 29 is tensioned for the next synchronization process, is not time-critical, in contrast to the engagement process.

Figure 10:
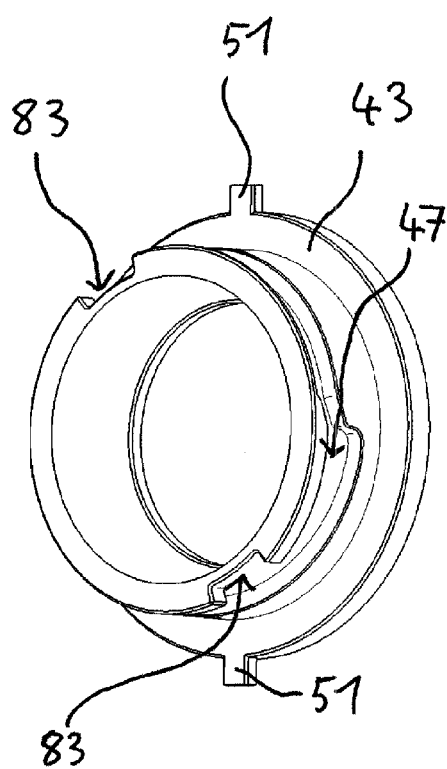
FIG. 10 illustrates a front view of a ramp ring with forms part of the ramp mechanism of FIG. 8.
Figure 11:
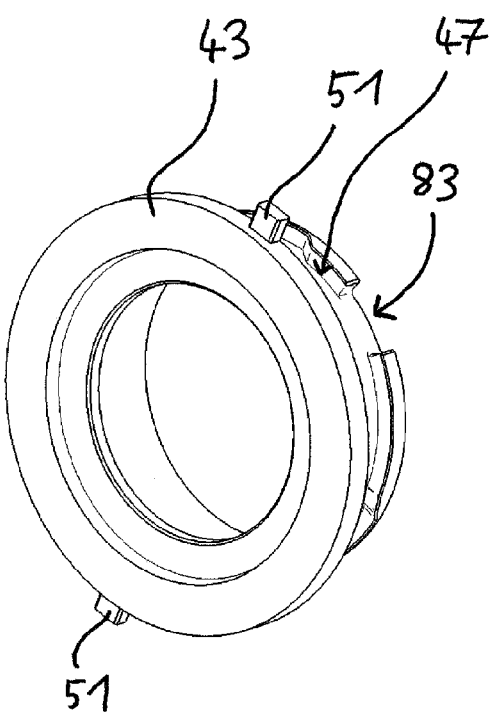
FIG. 11 illustrates a rear view of the ramp ring of FIG. 10.

As evident from the views of the ramp ring 43 illustrated in FIGS. 10 and 11, the switch ramp 47 has two openings 83 for installation purposes, so that the switch protrusions 45 of the worm gearwheel 39 can easily be inserted in the switch ramp 47.

The electric motor 49 (FIG. 4) uses a Hall effect sensor (not illustrated) to control the position of the worm gearwheel 39. As such a Hall effect sensor can only detect position changes, measures must be provided for defining a zero point or starting value on initialization of the associated control unit.

Figures 12, 13:
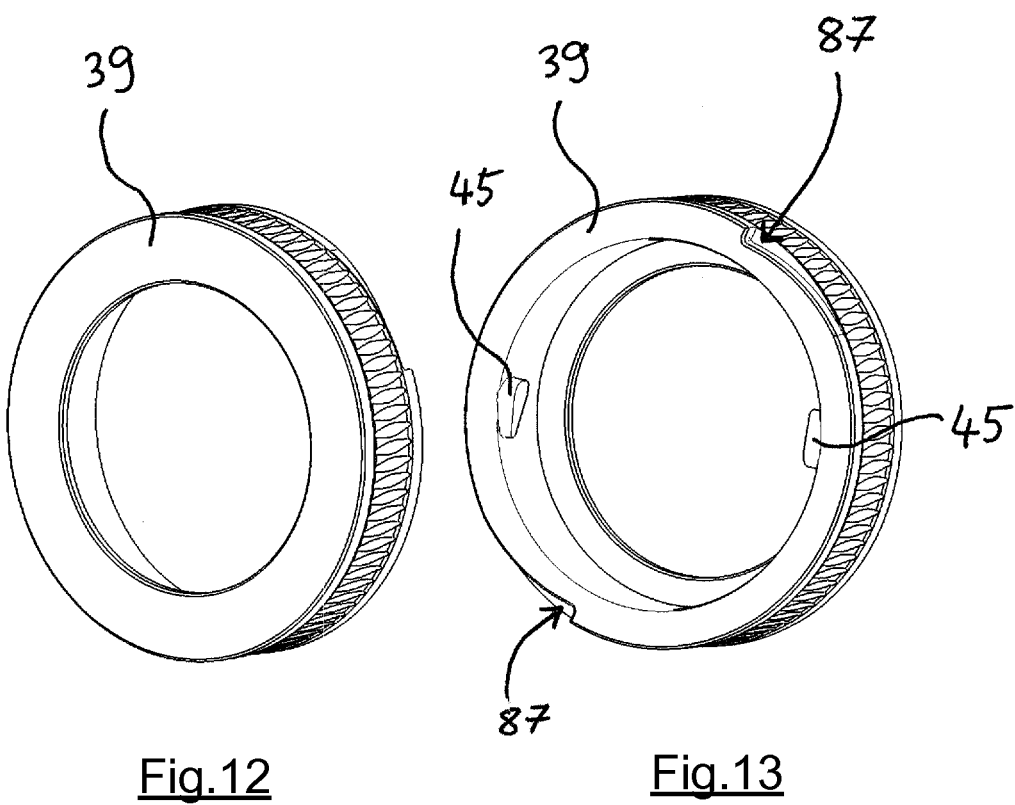
FIG. 12 illustrates a front view of a worm gearwheel which forms part of the ramp mechanism of FIG. 8.
FIG. 13 illustrates a rear view of the worm gearwheel of FIG. 12.
Figure 14:
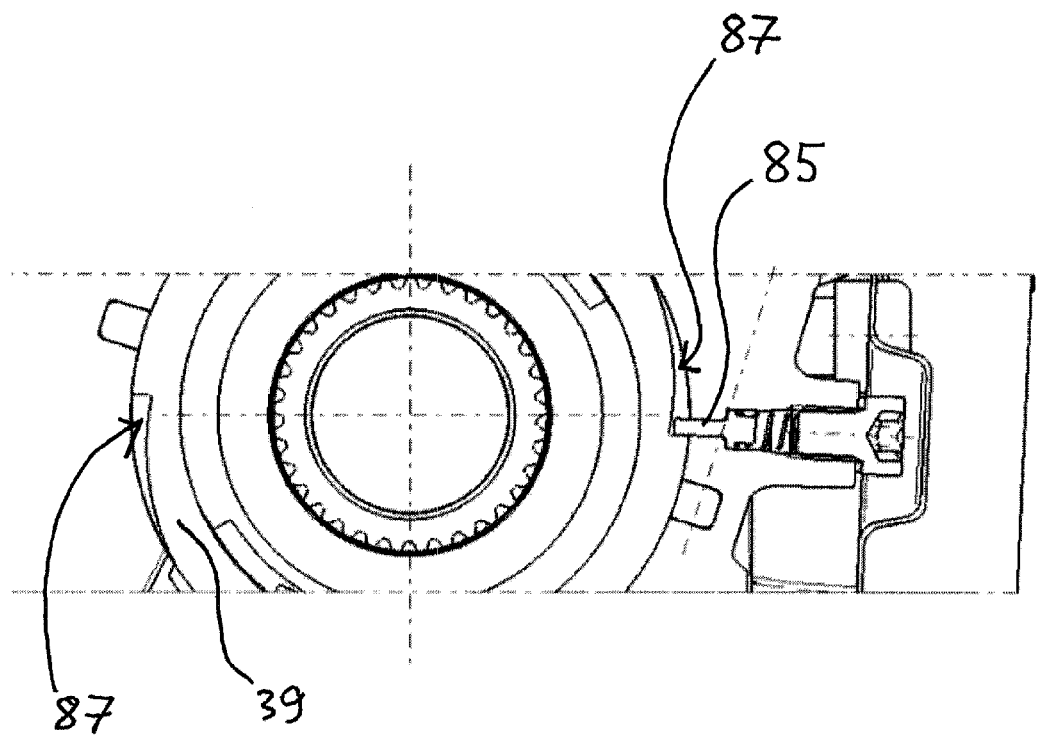
FIG. 14 illustrates a cross section view of the coupling arrangement of FIG. 1 in which the worm gearwheel cooperates with a stop pin.

As illustrated in FIGS. 12 to 14, a calibration mechanism is described for finding an initial value for the Hall effect sensor. Two different principles for performing the calibration are possible.

Firstly a fixed stop can be provided which, when the worm gearwheel 39 is twisted back corresponding to release of the claw-type clutch 11, stops the rotary movement of the worm gearwheel 39. In the embodiment example illustrated, a spring-tensioned pin 85 (FIG. 14) is used as a stop which, when the worm gearwheel 39 is twisted back, enters a recess 87 and on reaching its final limit blocks a further rotation of the worm gearwheel 39. Rotation of the worm gearwheel 39 in the opposite direction for re-engagement of the claw-type clutch 11 is however possible because of the design of the recess 87.

Secondly, in accordance with an embodiment not illustrated, catch notches can be provided on the sliding surfaces of the switch protrusions 45 and/or the switch ramp 47 in order to provoke slight torque pulses at the electric motor 49 which could be detected by the associated control unit as current peaks. These current peaks can be evaluated by a control logic to calculate the actual position of the worm gearwheel 39.

As illustrated in FIGS. 15 and 16, the design of the spring ring 33 is described in more detail. The snap fingers 55 provided to engage in the groove 60 have a spring action so that they can be pressed out of the groove 60 depending on its cross section form. The provision of several snap fingers 55 allows a greater total force. The synchronization torque occurring on the outer friction cone of the base body 53, which serves to accelerate the secondary drive train, is supported by the starting segments 88 of the snap fingers 55 present between the claws 30 of the second clutch part 21. The snap fingers 55 are first tapered with regard to their height and/or width towards the respective end segments 89 so that the material stress is constant over the length of the snap fingers 55. The end segments 89 of the snap fingers 55 themselves are however again widened so that the contact load diminishes.

The cross section of the groove 60 (FIG. 5) has a V-shaped course with predetermined angle, in the example illustrated 60°, to generate a defined axial force to press the snap fingers 55 out of the groove 60. The spring ring 33 is designed such that it can easily be manufactured from one stamping by punching and bending processes, with bends of around 90°. The groove 60 fixes the outer friction cone of the spring ring 33 also in the opened position of the claw-type clutch, in order to prevent drag losses in the synchronization device 31. So that an axial force is directly available for moving the spring ring 33 in the axial direction, the spring ring 33 has a corresponding pretension when it is in the groove 60.

Overall the actuator device 13 has a coaxial construction whereby it is very compact. In particular, no selector fork or similar component is required, as is usually provided in manual transmissions, automatic transmissions or torque converters. The spring ring 33 lies below the ramp ring 43 and the ramp ring 43 lies below the worm gearwheel 39. Thus, the axial length of the total arrangement is relatively small. The complete system, with the exception of the worm 37 and electric motor 49, has a tubular form. The invention thus allows a particularly compact construction and relatively low production costs for a coupling arrangement in a drive train.

Although embodiments have been described herein, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

LIST OF REFERENCE NUMERALS

- 11 Claw-type clutch
- 13 Actuator device
- 15 Housing
- 20 First clutch part
- 21 Second clutch part
- 23 Input half-shaft
- 25 Output half-shaft
- 27 Rotation speed sensor
- 29 Spring
- 30 Claw
- 31 Synchronization device
- 33 Spring ring
- 35 Synchronizer ring
- 37 Worm
- 39 Worm gearwheel
- 41 Control ring
- 42 Finger
- 43 Ramp ring
- 45 Switch protrusion
- 47 Switch ramp
- 49 Electric motor
- 82 Stop pin
- 51 Finger
- 53 Base body
- 55 Snap finger
- 60 Groove
- 65 Damping device
- 67 Damping chamber
- 69 Gap
- 71 Connection opening
- 73 Balancing chamber
- 75 Control wall segment
- 76 Face wall segment of control ring
- 77 Face wall segment of ramp ring
- 80 Rubber buffer
- 81 Top of switch ramp
- 83 Opening
- 85 Pin
- 87 Recess
- 88 Starting segment
- 89 End segment
- R Rotation axis
- K1 Closing direction
- K2 Opening direction

What is claimed is:

1. A coupling arrangement for a drive train of a motor vehicle, the coupling arrangement comprising:
   a clutch for arrangement on a shaft which is rotatable about an axis, the clutch including a first clutch part and a second clutch part;
   a first damping device to hydraulically dampen contact between the first clutch part and the second clutch part during engagement of the clutch;
   a second damping device to elastically dampen contact between the first clutch part and the second clutch part during engagement of the clutch;
   a spring to pretension the second clutch part in an engagement direction;
   an actuator device to activate the clutch, the actuator device having a ramp ring and a control ring which define a damping chamber of the first damping device; and
   a worm gearwheel which is rotatable about the axis of the shaft to axially displace the ramp ring along the axis of the shaft in a manner such that the second clutch part is also moved along the axis of the shaft via a sliding engagement with the ramp ring to thereby open the clutch.

2. The coupling arrangement of claim 1, wherein the damping chamber is to receive a fluid.

3. The coupling arrangement of claim 2, wherein movement of the second clutch part in the first direction causes compression of the fluid and controlled, delayed movement of the clutch.

4. The coupling arrangement of claim 2, wherein the damping chamber has at least one outflow opening to permit flow of the fluid out of the damping chamber when the clutch is in an engaged state.

5. The coupling arrangement of claim 2, further comprising a balancing chamber for fluidic connection with the damping chamber via a connection opening when the clutch is in a released state.

6. The coupling arrangement of claim 5, wherein the control ring comprises a control segment to initiate opening of the connection opening during release of the clutch and closure of the connection opening during engagement of the clutch.

7. The coupling arrangement of claim 2, further comprising at least one outflow opening to allow escape of the fluid from the damping chamber.

8. The coupling arrangement of claim 2, wherein the damping chamber is to be partially filled with the fluid when the clutch is in the released state.

9. The coupling arrangement of claim 1, wherein the ramp ring and the control ring are moveable relative to each other.

10. A coupling arrangement for a drive train of a motor vehicle, the coupling arrangement comprising:
- a clutch for arrangement on a shaft which is rotatable about an axis, the clutch including a first clutch part and a second clutch part to couple the rotating shaft to a drive element of the drive train;
- a hydraulic damping device to dampen contact between the first clutch part and the second clutch part;
- an actuator device to activate the clutch, the actuator device having a ramp ring and a control ring which define a damping chamber of the hydraulic damping device; and
- a worm gearwheel which is rotatable about the axis of the shaft to axially displace the ramp ring along the axis of the shaft in a manner such that the second clutch part is also moved along the axis of the shaft to thereby open the clutch.

11. The coupling arrangement of claim 10, wherein the damping chamber is to receive a fluid.

12. The coupling arrangement of claim 11, wherein movement of the second clutch part in the first direction causes compression of the fluid and controlled, delayed movement of the clutch.

13. The coupling arrangement of claim 12, wherein the damping chamber has at least one outflow opening to permit flow of the fluid out of the damping chamber when the clutch is in an engaged state.

14. The coupling arrangement of claim 12, further comprising a balancing chamber for fluidic connection with the damping chamber via a connection opening when the clutch is in a released state.

15. The coupling arrangement of claim 14, wherein the control ring comprises a control segment to initiate opening of the connection opening during release of the clutch and closure of the connection opening during engagement of the clutch.

16. The coupling arrangement of claim 12, further comprising at least one outflow opening to allow escape of the fluid from the damping chamber.

17. The coupling arrangement of claim 12, wherein the damping chamber is to be partially filled with the fluid when the clutch is in the released state.

18. The coupling arrangement of claim 12, wherein the ramp ring and the control ring are moveable relative to each other.

19. The coupling arrangement of claim 12, wherein movement of the second clutch part in the first direction causes compression of the fluid and controlled, delayed movement of the clutch.

20. A coupling arrangement for a drive train of a motor vehicle, the coupling arrangement comprising:
- a clutch for arrangement on a shaft which is rotatable about an axis, the clutch including a first clutch part and a second clutch part;
- a first damping device to hydraulically dampen contact between the first clutch part and the second clutch part during engagement of the clutch;
- a second damping device to elastically dampen contact between the first clutch part and the second clutch part during engagement of the clutch;
- an actuator device to activate the clutch, the actuator device having a ramp ring and a control ring which define a damping chamber of the hydraulic damping device; and
- a worm gearwheel which is rotatable about the axis of the shaft to axially displace the ramp ring along the axis of the shaft in a manner such that the second clutch part is also moved along the axis of the shaft to thereby open the clutch.

* * * * *